(12) United States Patent
Putnam et al.

(10) Patent No.: US 11,984,719 B2
(45) Date of Patent: *May 14, 2024

(54) QUICK BATTERY DISCONNECT SYSTEM FOR HIGH CURRENT CIRCUITS

(71) Applicant: RIVIAN IP HOLDINGS, LLC, Irvine, CA (US)

(72) Inventors: Todd Putnam, Laguna Beach, CA (US); Nathaniel C. Wynn, Tustin, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,935

(22) Filed: May 3, 2023

(65) Prior Publication Data

US 2023/0275421 A1 Aug. 31, 2023

Related U.S. Application Data

(63) Continuation of application No. 17/854,339, filed on Jun. 30, 2022, now Pat. No. 11,677,232, which is a (Continued)

(51) Int. Cl.
*H02H 7/18* (2006.01)
*B60L 50/60* (2019.01)
(Continued)

(52) U.S. Cl.
CPC ............... *H02H 7/18* (2013.01); *B60L 50/64* (2019.02); *B60L 50/66* (2019.02);
(Continued)

(58) Field of Classification Search
CPC ..... H02H 1/0007; H02H 7/18; H01M 50/581; H01M 2200/103; H01M 2200/203;
(Continued)

(56) References Cited

U.S. PATENT DOCUMENTS 11,289,766 B2    3/2022  O'Neil et al.
2003/0025480 A1*  2/2003  Pannwitz ............... H02J 7/0031
                                                                  361/91.1
(Continued)

FOREIGN PATENT DOCUMENTS

CN    101356707 A    1/2009
CN    101606272 A    12/2009
(Continued)

OTHER PUBLICATIONS

International Search Report and Written Opinion received for PCT Patent Application No. PCT/US2019/060835, dated Mar. 20, 2020, 9 pages.
(Continued)

*Primary Examiner* — Kevin J Comber
(74) *Attorney, Agent, or Firm* — Haley Guiliano LLP (57) ABSTRACT

A circuit protection system is provided herein that minimizes the disconnection time of a circuit while protecting other electrical components. Some configurations comprise a set of parallel circuit interruption devices, each connected in series with respective fuses. A control device sets a state of the circuit interruption device based on a current of the circuit. Under certain current loads, the circuit is interrupted without causing a fuse to blow. Under other current loads, the circuit is interrupted by having one or more fuses blow.

20 Claims, 4 Drawing Sheets

Related U.S. Application Data continuation of application No. 16/680,790, filed on Nov. 12, 2019, now Pat. No. 11,381,072.

(60) Provisional application No. 62/760,858, filed on Nov. 13, 2018.

(51) Int. Cl.
  *B60L 50/64* (2019.01)
  *H01M 50/581* (2021.01)
  *H02H 1/00* (2006.01)

(52) U.S. Cl.
  CPC ........ H01M 50/581 (2021.01); H02H 1/0007 (2013.01); *H01M 2200/103* (2013.01); *H01M 2220/20* (2013.01)

(58) Field of Classification Search
  CPC ........ B60L 50/64; B60L 50/66; H02J 7/0031; Y02T 10/70; Y02E 60/10; H01H 85/0241; H01H 85/12
  USPC .......................................... 361/93.1
  See application file for complete search history.

(56) References Cited

U.S. PATENT DOCUMENTS

| | | |
|---|---|---|
| 2007/0141457 A1 | 6/2007 | Amagai |
| 2011/0012435 A1 | 1/2011 | Cohen et al. |
| 2013/0181681 A1 | 7/2013 | Mukai et al. |
| 2015/0244165 A1 | 8/2015 | Roesner et al. |
| 2015/0371803 A1 | 12/2015 | Hosomizo et al. |
| 2016/0036220 A1 | 2/2016 | Lacaux et al. |
| 2016/0099459 A1 | 4/2016 | Doornekamp |
| 2017/0001584 A1 | 1/2017 | Harris et al. |
| 2017/0074252 A1 | 3/2017 | Madigan et al. |
| 2017/0200926 A1 | 7/2017 | Motokawa et al. |
| 2019/0140245 A1 | 5/2019 | Mensch et al. |
| 2020/0113072 A1* | 4/2020 | Oda ............... H05K 5/0008 |
| 2020/0152934 A1 | 5/2020 | O'Neil et al. |
| 2022/0209358 A1 | 6/2022 | O'Neil et al. |

FOREIGN PATENT DOCUMENTS

| | | |
|---|---|---|
| CN | 103204074 A | 7/2013 |
| CN | 105684254 A | 6/2016 |
| CN | 107953787 A | 4/2018 |
| DE | 10137875 C1 | 4/2003 |
| DE | 102012205957 A1 | 10/2013 |
| DE | 102012207669 A1 | 11/2013 |
| DE | 102014200265 A1 | 7/2015 |
| DE | 102014218850 A1 | 3/2016 |
| EP | 1282211 A2 | 2/2003 |
| EP | 1851841 A1 | 11/2007 |
| JP | 09-284902 A | 10/1997 |
| JP | 2011-010483 A | 1/2011 |
| JP | 2011-020553 A | 2/2011 |
| KR | 10-2015-0076913 A | 7/2015 |
| WO | 2006/089904 A1 | 8/2006 |
| WO | 2013/113473 A1 | 8/2013 |
| WO | 2015/099476 A1 | 7/2015 |
| WO | 2020/102092 A1 | 5/2020 |

OTHER PUBLICATIONS

Machine Translation of Fages-Trafanelli et al. German Patent Document DE 102014218850 A1 Mar. 24, 2016 (Year: 2016).
Machine Translation of Iwasa et al. Japanese Patent Document JP 2011-20553 A Feb. 3, 2011 (Year: 2011).

* cited by examiner

QUICK BATTERY DISCONNECT SYSTEM FOR HIGH CURRENT CIRCUITS

CROSS-REFERENCE TO RELATED APPLICATIONS

This application is a continuation application of U.S. patent application Ser. No. 17/854,339, which is a continuation of U.S. patent application Ser. No. 16/680,790, filed Nov. 12, 2019, now U.S. Pat. No. 11,381,072, which claims the benefit of U.S. Provisional Application No. 62/760,858, filed Nov. 13, 2018, each of which is hereby incorporated by reference herein in their entireties.

INTRODUCTION

Electric vehicles typically include a high power battery connected to a load, such as an electric drive unit. The voltage across the terminals of such batteries can exceed 300V with an operating current exceeding 500 A. Because a short circuit across the terminals can result in danger to the occupants of the electric vehicle and/or damage to the vehicle's components, conventional electric vehicles include a fuse in series with the battery and the load to interrupt the short circuit. Typically, a rated current capacity of the fuse is selected based on a maximum expected operating current of the electric vehicle. Due to the thermal, non-linear nature of conventional fuses, as the rated current capacity of a fuse increases, so does an amount of time required to cause the fuse to interrupt the circuit. Consequently, a conventional fuse may not interrupt a circuit quickly enough to prevent damage to the circuit.

SUMMARY

In some embodiments, a battery system is provided. The battery system comprises two fuses, two contactors, and one or more battery cells. The two fuses, the two contactors, and the one or more battery cells each comprise two terminals. A first terminal of the one or more battery cells is electrically coupled in parallel to a first electrical terminal of the first fuse and of the second fuse. A second terminal of the first fuse is electrically coupled to a first terminal of a first contactor and a second terminal of the second fuse is electrically coupled to a first terminal of the second contactor. A second terminal of the first contactor and a second terminal of the second contactor are electrically coupled in parallel (e.g., via a busbar). The first fuse and the second fuse each comprise a locally minimum cross-sectional area configured to melt at a predetermined current, thereby interrupting a circuit when the current is surpassed.

In some embodiments, the battery system further comprises a contactor control module configured to set at least one of an open state and a closed state of the first contactor and the second contactor. In such embodiments, the contactor control module may control the state of the first contactor and the second contactor via control terminals of the respective contactors. In some embodiments, the contactor control module is configured to set one of the first contactor and the second contactor to the open state based on detecting a current within a predetermined amperage range. In such embodiments, the predetermined amperage range may be within 2,400 to 5,000 amps. In some embodiments, the contactor control module is configured to maintain both of the first contactor and the second contactor in the closed state based on detecting a current greater than a predetermined amperage. For example, in such embodiments the predetermined amperage range may be at least 5,000 amps.

In some embodiments, the battery system is located in an electric vehicle. In such embodiments, the contactor control module is further configured to detect a vehicle fault condition. In response to detecting the vehicle fault condition, the contactor control module sets the first contactor to the open state and sets the second contactor to the closed state. While the vehicle fault condition exists, the electric vehicle may be operated in a reduced performance mode.

In some embodiments, a busbar electrically coupling the second terminals of the first and second contactors provides switched power to the electric vehicle. In some embodiments, a third contactor is electrically coupled to the busbar via a first contactor terminal. The second contactor terminal is electrically coupled to a charging port.

In some embodiments, each of a first contactor terminal of a fourth and a fifth contactor is electrically coupled in parallel (e.g., via a busbar) to a second battery module terminal (e.g., a negatively charged terminal). A busbar may electrically couple the second contactor terminals of the fourth and fifth contactors in parallel and may provide switched power to the electric vehicle.

In some embodiments, a first battery module terminal is electrically coupled to a positive terminal of the one or more battery cells, and a second battery module terminal is electrically coupled to a negative terminal of the one or more battery cells. The first battery module terminal and the second battery module terminal may be unswitched terminals. In some embodiments, the voltage across the first battery module terminal and the second battery module terminal is greater than 300 volts. The battery system may have a maximum operational current that is within 1,000 amps and 2,500 amps.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

As battery technology has advanced, the voltage and operating current of electric vehicle battery modules has increased. A short circuit across the terminals of an electric vehicle's high power battery module can result in danger to the occupants of the vehicle and/or damage to the vehicle's components. To protect the occupants and the electrical components, electric vehicles include a battery disconnection component, oftentimes a fuse, configured to disconnect power from the battery during an overcurrent event. Typically, a rated current capacity of the fuse is selected based on a maximum expected operating current of the electric vehicle. Due to the thermal, non-linear nature of conventional fuses, as the rated current capacity of a fuse increases, so does an amount of time required to cause the fuse to interrupt the circuit. Because damage caused by a short circuit event can be proportional to the duration of the event, the increased interruption time can result in damage to the electric vehicle that could have otherwise been prevented with quicker disconnection.

The present disclosure is directed to a system for quickly disconnecting a battery pack from a circuit in the event that the circuit is experiencing an overcurrent event. For example, an electric circuit, such as an electric circuit in an electric vehicle, may comprise a high power battery pack connected to a plurality of electronics, such as one or more motors, controllers, air conditioning systems, lighting circuitry, infotainment systems, etc., with a wiring harness electrically coupling the various electronics to the battery. If one or more of the components in the circuit experiences an electrical fault (e.g., a short circuit in the harness caused by a vehicle crash or a malfunction of one of the electronics), the battery disconnect system described herein can quickly disconnect the battery from the circuit to prevent or reduce the amount of damage to the circuit components due to the electrical fault.

Figure 1:
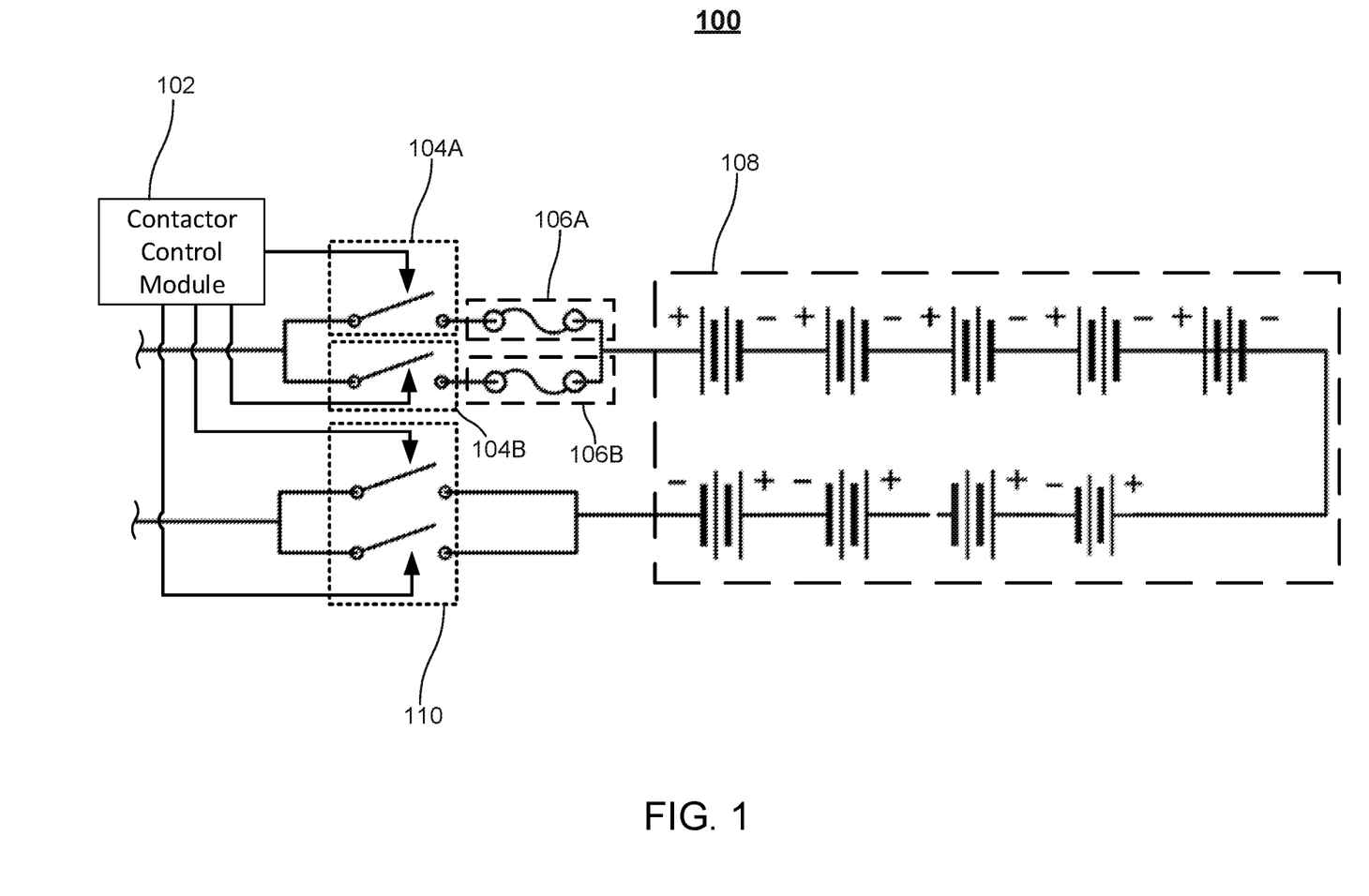
FIG. 1 shows an exemplary configuration of contactors, fuses, and battery cells, in accordance with some embodiments of the present disclosure.

FIG. 1 depicts an exemplary configuration of contactors, fuses, and battery cells, in accordance with some embodiments of the present disclosure. Configuration 100 depicts contactors 104A, 104B, and 110, contactor control module 102, fuses 106A and 106B, and battery module 108 arranged to reduce the amount of time required to disconnect a battery from a load under various circuit currents. The exemplary system depicted in configuration 100 comprises at least two parallel fused paths (e.g., a first path formed by contactor 104A and fuse 106A and a second path formed by contactor 104B and fuse 106B) connected to a battery terminal (e.g., a battery terminal of battery module 108). The parallel path is formed by electrically coupling (e.g., via a busbar) a first fuse terminal of fuse 106A and a first fuse terminal of fuse 106B to a first battery terminal of battery module 108 (e.g., a positively charged terminal).

In some embodiments, battery module 108 comprises a plurality of battery cells connected in series and parallel connections having a total potential exceeding 300 volts. In some embodiments, a total circuit current, supplied by battery module 108, can vary between 600 amps to 1,000 amps. Because the current is roughly split equally across the parallel fused paths (e.g., the first path formed by contactor 104A and fuse 106A and the second path formed by contactor 104 B and fuse 106B), the rated current of each fuse is selected such that the rated current is less than a desired maximum operational circuit current (e.g., 600-1,000 amps). For example, in a dual fuse configuration depicted in FIG. 1, each of fuses 106A and 106B may be selected to have a rated current of approximately one half (e.g., 300-500 amps) the desired maximum operational circuit current (e.g., 600-1,000 amps). Due to the thermal properties of conventional fuses, each of fuses 106A and 106B in the dual fuse configuration (e.g., fuses with a rated current of approximately 300-500 amps) has a significantly lower interruption time than would a conventional fuse having double the rated current (e.g., a fuse with a rated current between 600-1,000 amps). Therefore, in an overcurrent event exceeding 1,000 amps, dual 500 amp fuses would interrupt a circuit more quickly than a single fuse of 1,000 amps.

Each of the fused parallel paths comprises a respective contactor connected in series to the fuse. For example, a first contactor terminal of contactor 104A is electrically coupled in series to a second fuse terminal of fuse 106A, and a first contactor terminal of contactor 104B is electrically coupled to a second fuse terminal of fuse 106B. A respective second contactor terminal of contactor 104A and contactor 104B may be electrically coupled in parallel (e.g., via a busbar) to a load (e.g., a positive terminal of the load).

In some embodiments, a second set of contactors is electrically coupled to the load and the battery module. For example, a first contactor terminal of each of contactors 110 may be electrically coupled (e.g., via a busbar) to a second terminal of battery module 108 (e.g., a negatively charged terminal). A second contactor terminal of each of contactors 110 may be electrically coupled in parallel to the load (e.g., a negative terminal of the load).

In some embodiments, each of contactors 104A, 104B, and 110 is configurable to electrically couple or decouple the circuit from the battery terminal (e.g., based on a signal received from contactor control module 102). Each of the contactors (e.g., contactors 104A, 104B, and 110) have a respective maximum disconnect current and may safely couple and decouple an electrical circuit while under a load that is less than the maximum disconnect current. If the load exceeds the maximum disconnect current, a contactor may be damaged if decoupling occurs. In some embodiments, each contactor (e.g., contactors 104A, 104B, and 110) comprises a contactor control terminal electrically coupled to contactor control module 102. In such embodiments, contactor control module 102 controls an open state and a closed state of the contactor.

In some embodiments, if the battery system detects an overcurrent event of the circuit that is less than the maximum disconnect current of each contactor, contactor control module 102 may cause contactors 104A, 104B and 110 to open, thereby quickly decoupling the circuit from the battery without blowing the fuses. In some embodiments, in response to detecting the overcurrent event below the maximum disconnect current of each contactor, the contactor control module may instruct one of contactors 110 or contactors 104A and 104B to open, thereby decoupling either the first battery terminal or the second battery terminal of battery module 108 from the circuit.

In some embodiments, if the battery system detects an overcurrent event of the circuit that is greater than the maximum disconnect current of each contactor, but less than double the maximum disconnect current, the system may decouple one parallel path from the battery terminal (e.g., the parallel path formed by contactor 104A and 106A), resulting in the fuse in the second parallel path (e.g., fuse 106B) to exceed the rated current and blow the fuse, thereby disconnecting the circuit. In some embodiments, the rated current of the fuses may be selected to be similar to the maximum disconnect current of contactors. Because of the smaller rated current of the fuse (relative to a fuse that requires double the rated current), the system is able to blow one of the parallel fuses more quickly than would be necessary for a single fuse requiring double the interruption current. Because damage caused by a short circuit event may be proportional to the duration of the event, the reduction in interruption time may result in reduced damage to the circuit. However, because the overcurrent event of the circuit exceeds the maximum disconnect current for the contactor (e.g., contactor 104A), the contactor will be damaged during the decoupling. In some embodiments, when the battery system is located in an electric vehicle, the battery system will maintain a record indicating that one of the contactors is damaged and will notify an operator of the electric vehicle. In some embodiments, the electric vehicle will operate in a reduced power mode (e.g., half of a current for normal operation). Upon replacement of the damaged components the system will resume normal operation.

In some embodiments, if the battery system detects an overcurrent event that is greater than double the maximum disconnect current, the battery system, via contactor control module 102, will maintain contactors 104A, 104B, and 110 in a closed state, thereby causing fuses 106A and 106B in the parallel paths to blow (e.g., because the current rating for the fuse is chosen to be less than or equal to the maximum disconnect current of the contactor).

Although the fused parallel paths are discussed with respect to a connection to a positive terminal of the battery, the fused parallel paths may instead be connected to a negative terminal of the battery. In some embodiments, a first set of parallel paths may be connected to the positive terminal of the battery and a second parallel path may be connected to a negative terminal of the battery.

Figure 2:
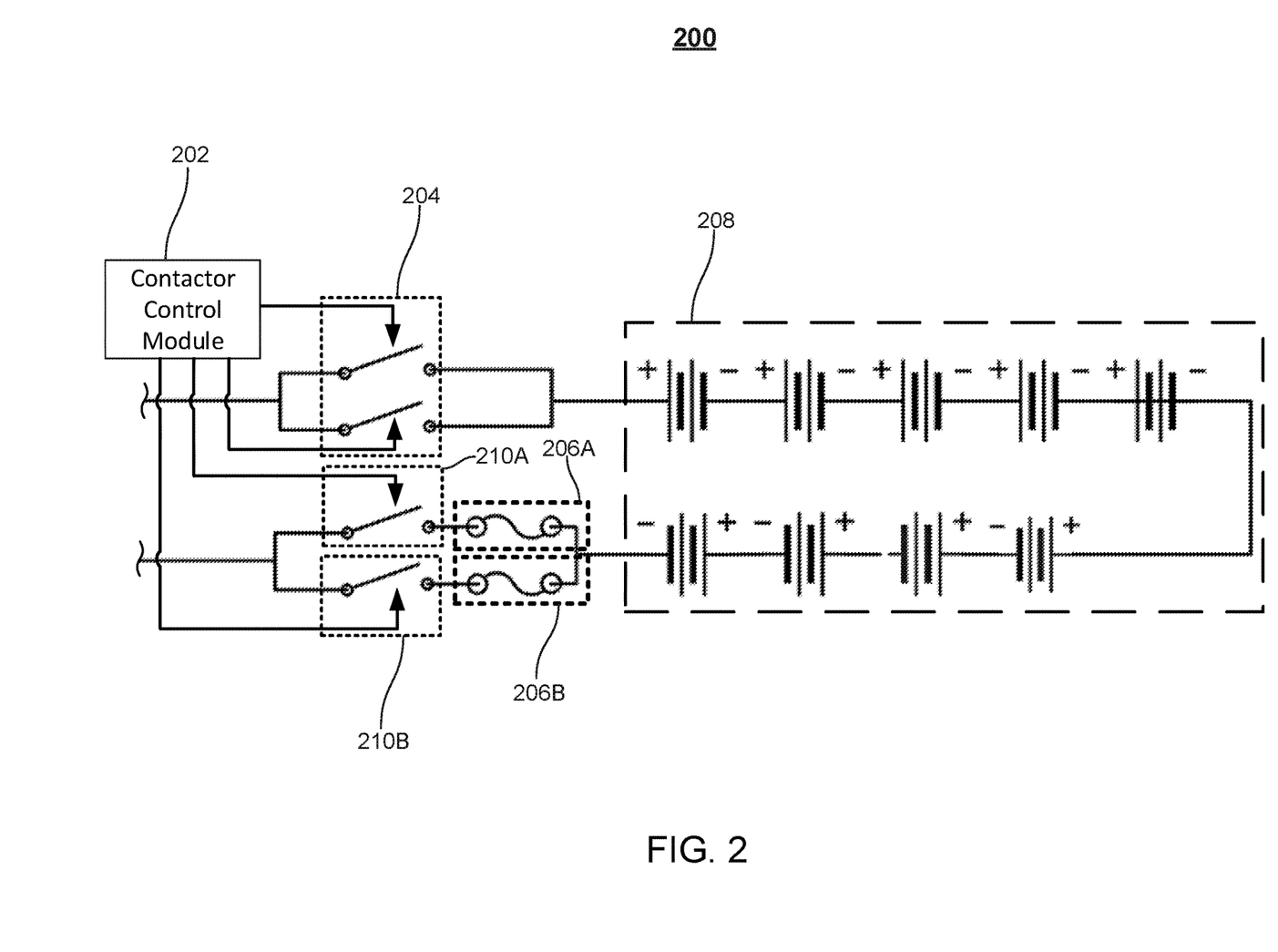
FIG. 2 shows an additional exemplary configuration of contactors, fuses, and battery cells, in accordance with some embodiments of the present disclosure.

FIG. 2 depicts an additional exemplary configuration of contactors, fuses, and battery cells, in accordance with some embodiments of the present disclosure. In some embodiments, the contactors (e.g., contactors 104A, 104B, and 110), fuses (e.g., fuses 106A and 106B), contactor control module (e.g., contactor control module 102), and battery module (e.g., battery module 108) described with respect to FIG. 1 are electrically equivalent to the corresponding components depicted in FIG. 2. In configuration 200, a fused parallel path is connected to a negative terminal of the battery module, instead of the positive terminal of the battery module as in configuration 100. A first terminal of a first fuse (e.g., fuse 206A) and a second fuse (e.g., fuse 206B) are electrically coupled in parallel to a negative terminal of the battery (e.g., battery module 208).

Battery module 208 may comprise a plurality of battery cells connected in parallel and series connections having a total electrical potential exceeding 300 volts across a most positively charged terminal of the battery module and a most negatively charged terminal of the battery module. A second terminal of the first fuse (e.g., fuse 206A) is electrically coupled to a first terminal of a first contactor (e.g., contactor 210A). A second terminal of the second fuse (e.g., fuse 206B) is electrically coupled to a first terminal of a second contactor (e.g., contactor 210B). The second terminals of the first and second contactors are electrically coupled in parallel. In some embodiments, the second terminals of the first and second contactors are electrically coupled in parallel to a busbar that provides switched power to an electric vehicle. In some embodiments, the busbar is electrically coupled to a third contactor configured to control a charging circuit of the battery (discussed further below with respect to FIG. 3).

A second, non-fused, parallel path is connected to a positive terminal of battery module 208. A respective first contactor terminal of contactors 204 is electrically coupled in parallel (e.g., via a busbar) to a positively charged terminal of battery 208. Although configuration 200 depicts two contactors in the second parallel path (e.g., contactors 204) one or more contactors may be used without departing from the scope of the present disclosure. A respective second contactor terminal of each contactor may be electrically coupled in parallel (e.g., via a busbar). In some embodiments, the second contactor terminals are electrically coupled to a load and/or a third contactor configured to control a charging circuit of the battery.

Although configurations 100 and 200 depict the fused parallel paths having a terminal of the fuse electrically coupled to a battery in series with a contactor, the order of the fuse and the contactor in series can change without departing from the scope of the present disclosure. For example, a first contactor terminal of a first contactor (e.g., contactor 104A or contactor 210A) may be electrically coupled to a positive terminal of a battery module (e.g., battery module 108 or 208). A second contactor terminal of the first contactor (e.g., contactor 104A or contactor 210A) may be electrically coupled to a first fuse terminal of a first fuse (e.g., fuse 106A or 206A). A second fuse terminal of the first fuse (e.g., fuse 106A or 206A) may be electrically coupled to a load and the second parallel path (e.g., the series connection between fuse 106B and contactor 104B or the series connection between fuse 206B and contactor 210B).

Figure 4:
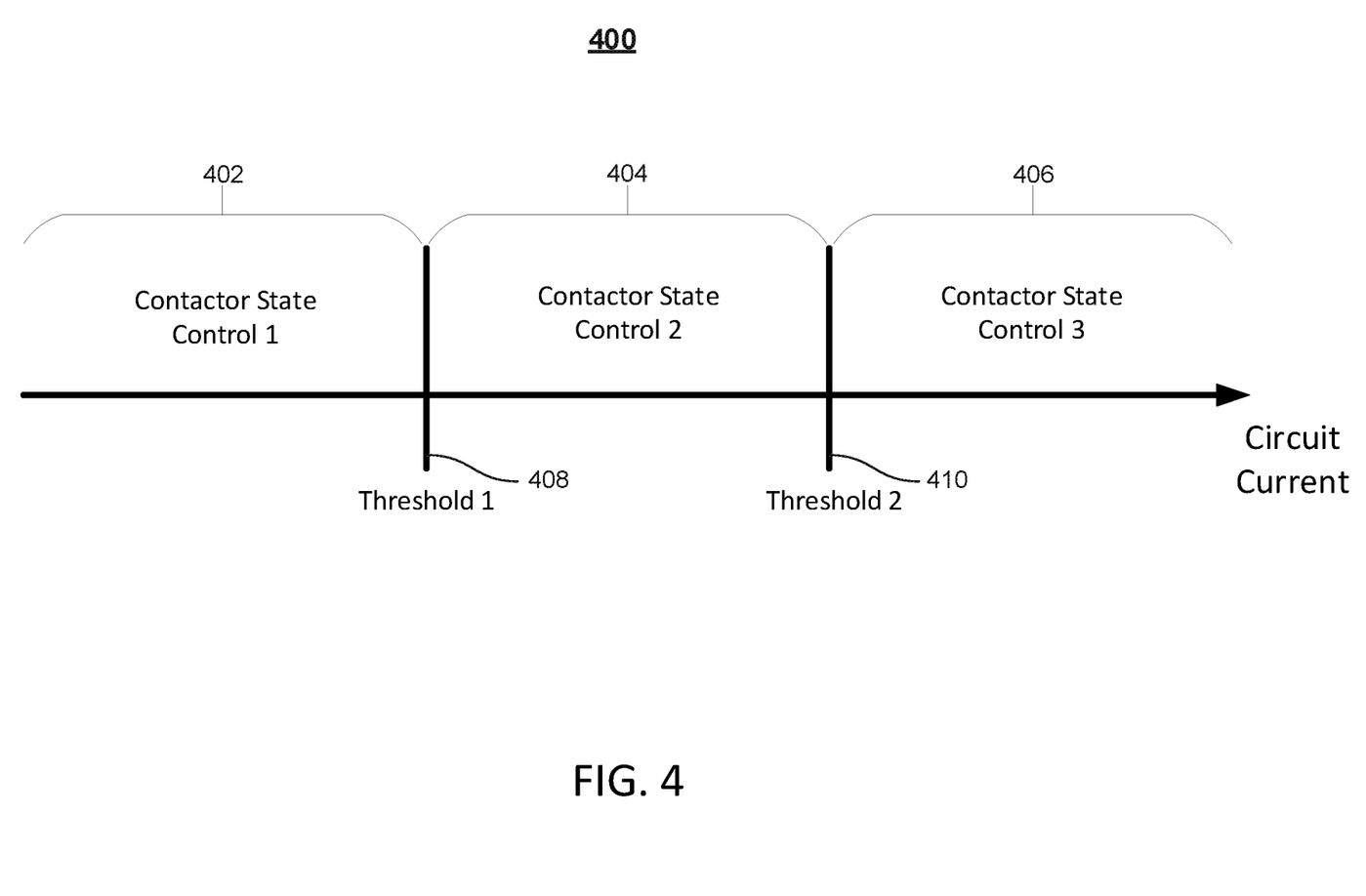
FIG. 4 shows an exemplary contactor control configuration, in accordance with some embodiments of the present disclosure.

In some embodiments, when contactor control module 102 or 202 detects a fault event (e.g., a vehicle crash or a short circuit), the contactor control module may set the state of the first contactor (e.g., contactor 104A or 210A) and/or the second contactor (e.g., contactor 104B or 210B) based on a measured current value to optimally minimize the disconnection time (discussed further in relation to FIG. 4). When the contactor control module detects a fault event and the circuit current is below the maximum contactor disconnect current (e.g., due to a crash), the contactor control module may open both contactors (e.g., contactors 104A and 104B or contactors 210A and 210B). When the contactor control module detects a current overload less than twice the maximum contactor disconnect current but greater than the maximum contactor disconnect current, the contactor control module may open a contactor on a first parallel path to increase the current on and thus overload the fuse on the second parallel path (e.g., contactor control module 202 may open contactor 210A and leave contactor 210B closed, thereby causing fuse 206B to blow and interrupt the circuit). When the contactor control module detects a current overload that exceeds twice the maximum contactor disconnect current, the contactor control module may keep both contactors closed (e.g., both of contactors 104A and 104B or contactors 210A and 210B), causing the fuses (e.g., both of fuses 106A and 106B or fuses 206A and 206B) to overload on both parallel paths. By setting or maintaining an open or closed state for each of the contactors under the various current conditions, the system is able to optimally minimize disconnect time.

Figure 3:
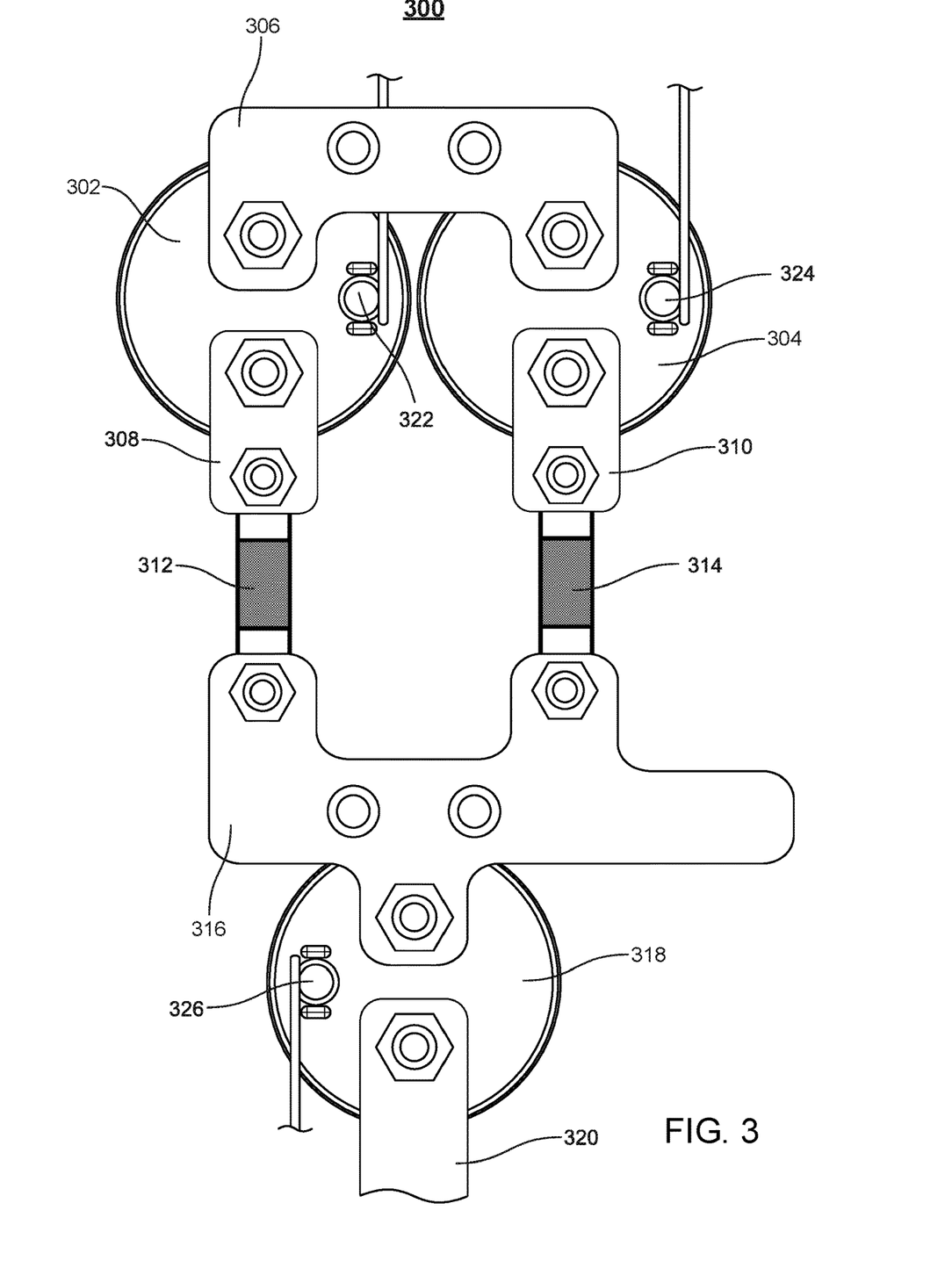
FIG. 3 shows illustrative contactors and fuses arranged in accordance with some embodiments of the present disclosure.

FIG. 3 shows illustrative contactors and fuses arranged in accordance with some embodiments of the present disclosure. Arrangement 300 depicts an exemplary fused parallel path (e.g., one of the parallel paths depicted in FIGS. 1 and 2) coupled with a charging circuit. In arrangement 300, busbar 306 electrically couples a respective first contactor terminal of first contactor 302 and second contactor 304 in parallel to a battery module terminal (e.g., a positive or negative terminal of battery module 108 and 208). In some embodiments, contactors 302 and 304 may operate in the manner described above regarding contactors 104A and 104B in FIG. 1 and contactors 210A and 210B in FIG. 2, to reduce a disconnection time of the circuit during an overcurrent event. In some embodiments, contactors 302 and 304 each comprise a respective contactor control terminal (e.g., contactor control terminal 322 and contactor control terminal 324), which is electrically coupled to a contactor control module (e.g., contactor control module 102 depicted in FIG. 1 or contactor control module 202 depicted in FIG. 2). The contactor control module may set a state of the contactors by sending a signal to open or close the contactors via contactor control terminals 322 and 324.

In some embodiments, the contactor control module is configured to set the contactor to the open state (e.g., electrically decoupling an internal connection between the first terminal of the contactor and the second terminal of the contactor) or closed state (e.g., electrically coupling an internal connection between the first terminal of the contactor and the second terminal of the contactor), based on a circuit current and/or an operating state of the vehicle. For example, when a user turns on the electric vehicle, the contactor control module may set contactor 302 and contactor 304 to a closed state, from an open state. In another example, the contactor control module may set one or more of contactors 302 and 304 to an open state, from a closed state, based on detecting an overcurrent event. In some embodiments, the contactor control module selects the number of contactors to an open state during an overcurrent event based on a detected circuit current (discussed further below with respect to FIG. 4).

A second contactor terminal of first contactor 302 is electrically coupled to a first fuse terminal of first fuse 312 via busbar 308. A second contactor terminal of second contactor 304 is electrically coupled to a first fuse terminal of second fuse 314 via busbar 310. The respective second fuse terminals of first fuse 312 and second fuse 314 may be electrically coupled in parallel via busbar 316. In some embodiments, busbar 316 is electrically coupled to a load, such as an electric motor. A current rating of fuses 312 and 314 may be selected as described above regarding fuses 106A and 106B in FIG. 1, and fuses 206A and 206B in FIG. 2. For example, if an expected maximum circuit current of the electric vehicle is 1,000 amps, the current rating for each of fuses 312 and 314 may be 500 amps, half of the maximum circuit current.

In some embodiments, busbar 316 is additionally coupled to a charging contactor, such as contactor 318, via a first contactor terminal. Charging contactor 318 may control an inflow of current to charge a battery module (e.g., battery module 108 or 208). The contactor control module (e.g., contactor control module 102 or 202) may control an open or a closed state of contactor 318 based on a charging state of the battery. For example, the battery control module (e.g., via contactor control module 108 or 208) may set contactor 318 to an open state (e.g., via contactor control terminal 326) when the battery is not charging and to a closed state when the battery is charging.

Although FIG. 3 is depicted having parallel paths (e.g., the first path comprising contactor 302 and fuse 312, and the second path comprising contactor 304 and fuse 314, one or more paths may exist between the battery module and the load without departing from the scope of the present disclosure. In some embodiments, a fuse is not placed in series with the contactors (e.g., depicted as contactors 110 in FIG. 1 and as contactors 204 in FIG. 2). In such embodiments, the second contactor terminals of contactors 302 and 304 may be electrically coupled to the charging contactor (e.g., contactor 318) via busbar 316, without having a connection to busbars 308 and 310, or fuses 312 and 314.

FIG. 4 depicts an exemplary contactor control diagram, in accordance with some embodiments of the present disclosure. Diagram 400 visually depicts how the contactor control module may determine whether or not to open one or more contactors during an overcurrent event, based on the circuit current. In diagram 400, the contactor control module sets the contactors (e.g., contactors 302 and 304) to first state 402 when the circuit current is below first threshold 408; sets the contactors to second state 404 when the circuit current is within first threshold 408 and second threshold 410; and sets the contactors to third state 406 when the circuit current is above second threshold 410. The various states and thresholds depicted in diagram 400 may be selected based on the electrical parameters of components in the electric vehicle (e.g., current ratings of the fuses and contactors, a maximum circuit current, disconnect times, etc.) and are optimized to reduce the disconnect time during an overcurrent event and protect the electric vehicle's components. For example, contactors may be able to interrupt a circuit more quickly than a fuse under a same circuit current. However, a contactor may only interrupt a circuit without causing damage to the contactor when the circuit current is less than a threshold value. Under certain overcurrent events it may be more favorable to interrupt a circuit using by disconnecting both contactors, whereas under other circuit currents (e.g., where damage to a contactor may occur if disconnected), it may be favorable to keep one or more contactors closed and blow a fuse.

In first state 402, the contactor control module sets both of the contactors (e.g., contactors 302 and 304) to an open state in response to detecting an overcurrent event that is less than the first threshold. For example, the contactors may safely interrupt a current of 2,400 amps each without becoming damaged. The contactor control module may instruct the contactors to open when the overcurrent event is below 2,400 amps, without causing damage to the contactors. For example, the contactor control module may determine that the electric vehicle has been in a crash (e.g., based on a communication from a crash detection system). If the circuit current is under 2,400 amps when the contactor control module detects the crash, the contactor control module instructs the first contactor (e.g., contactor 302) and the second contactor (e.g., contactor 304) to open. In some embodiments, the time to disconnect the current between the battery module and the load may be the sum of the time it takes the control module to control the contactors (e.g., 50 ms) plus a time required by the contactor to open after receiving the control signal (e.g., 25 ms). Because the first contactor and the second contactor open without causing or waiting for the fuses to blow, the system is able to more quickly disconnect the battery module from the load than a comparable system comprising only fuses. Furthermore, because the contactors were opened under a normal operating current (e.g., less than the first threshold current), the contactors and fuses may not need to be replaced before the vehicle is returned to service.

In second state 404, the contactor control module sets a first of the two contactors to an open state (e.g., contactor 302) and maintains the second of the two contactors (e.g., contactor 304) in a closed state when the current is above first threshold 408 but below second threshold 410. As discussed above, the first threshold may be selected based on a maximum current where the contactor can safely disconnect a circuit under load without causing damage to the contactor (e.g., 2,400 amps). Because the current is divided equally across both paths in parallel, the contactors may be able to safely disconnect circuit currents under a higher load, double the normal operating current (e.g., 5,000 amps). However, under such loads, the opened contactor may be damaged upon disconnecting the circuit. In second state 404, when the contactor control module instructs the first contactor to open (e.g., contactor 302), the current is routed through the second path (e.g., the path comprising contactor 304 and fuse 314). Because the circuit current (e.g., between 2,400 amps and 5,000 amps) greatly exceeds the rated current of the fuse (e.g., 1,000 amps), the fuse is blown and the circuit is interrupted. Under such conditions, the first contactor (e.g., contactor 302) may be damaged because the contactor was opened under a load exceeding 2,400 amps.

In some embodiments, the contactor control module monitors a current output of the battery (e.g., based on a communication from a battery monitoring system, a motor controller, or by monitoring a change in current over time and may determine that the change in current over a given time period exceeds a predefined value). For example, the contactor control module may detect a soft short, such as a powertrain overcurrent event having a circuit current between the first threshold, 2,400 amps, and the second threshold, 5,000 amps. In some embodiments, the time to interrupt the current between the battery module and the load may be the sum of the time for the control module to control the contactors (e.g., 50 ms) plus a time required by the contactor to open after receiving the control signal (e.g., 25 ms) plus a time required for the fuse to blow at the circuit current (e.g., 1 s). Because of the thermal nature of fuses, the interruption time may increasingly drop as the circuit current increases.

In some embodiments, in response to detecting a vehicle fault condition, such as a soft short, the battery system may run the car in a reduced power mode (e.g., by utilizing 50% of the normal operating current). Under the reduced power mode, the battery system may set the first contactor to an open state and the second contactor to a closed state, thereby reducing the maximum operating current of the battery system by half. In such embodiments, the battery system may operate in conjunction with other systems of the car, such as the motor controller, to maintain the circuit current below the reduced maximum operating current.

In third state 406, when the circuit current is above second threshold 410, the contactor control module maintains the first contactor (e.g., contactor 302) and the second contactor (e.g., contactor 304) in a closed state. For example, when the overcurrent event exceeds 5,000 amps (e.g., based on a hard short between the most positive switched terminal of the battery and the most negative switched terminal of the battery), the contactor control module may keep the first contactor and the second contactor closed, thereby causing fuses 312 and 314 to blow. In third state 406, the disconnection time is highly dependent on the characteristics of the fuse. For example, during an overcurrent event of 5,000 amps, the disconnection time for the two fuses may be an order of magnitude greater than the disconnection time during an overcurrent event at 20,000 amps.

In some embodiments, the battery system may additionally comprise at least one contactor electrically coupled to a terminal of the battery that is unfused (depicted as contactors 110 in FIG. 1 and as contactors 204 in FIG. 2). For example, the battery system may comprise a fourth and a fifth contactor, each having a respective first terminal electrically coupled in parallel to a terminal of the battery (e.g., a negative terminal of the battery). The fourth and fifth contactors may each comprise a respective second terminal that is coupled in parallel to a busbar. The busbar may be electrically coupled to the load. In some embodiments, the contactor control module controls the state of the fourth and fifth contactors as described above in accordance with FIG. 4.

Although the above examples are discussed with respect to a dual contactor and dual fuse configuration, one or more contactors may be used. For example, some embodiments include three contactors having a first terminal electrically coupled in parallel to a first battery terminal and a second terminal electrically coupled in series to a first terminal of a respective fuse. A second terminal of the respective fuses may be electrically coupled in parallel and to a load. A second battery terminal may be electrically coupled to one or more contactors (e.g., an unfused parallel combination of three contactors). Each of the contactors may comprise a respective contactor control terminal, and a contactor control module may control setting the contactors to an open or a closed state during an overcurrent event or a crash to minimize a disconnection time between the battery module and the load.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. An apparatus comprising:
 a first switch and a first fuse electrically coupled to a second switch and a second fuse; and
 a battery electrically coupled to the first fuse and the second fuse wherein:
 the first switch and the second switch are both in a closed state during a first mode of operation; and
 the first switch is opened while maintaining the second switch in the closed state in response to detecting a fault during the first mode of operation.

2. The apparatus of claim 1, wherein the fault corresponds to a load current exceeding an amperage.

3. The apparatus of claim 2, wherein the amperage is equal to a maximum disconnect current of the first switch and the second switch.

4. The apparatus of claim 1, wherein the first switch and the first fuse are electrically coupled in parallel to the second switch and the second fuse.

5. The apparatus of claim 1, wherein the battery is electrically coupled in parallel to the first fuse and the second fuse.

6. The apparatus of claim 1, further comprising one or more electric motors electrically coupled to the first switch and the second switch.

7. The apparatus of claim 6, wherein the one or more electrical motors is electrically coupled in parallel to the first switch and the second switch.

8. The apparatus of claim 6, wherein a current rating of the first fuse and the second fuse is one half a maximum operating current of the one or more electric motors.

9. An apparatus comprising:
 a first path comprising a first switch electrically coupled with a first fuse; and
 a second path comprising a second switch electrically coupled to a second fuse, wherein:
 the first switch and the second switch are both in a closed state during a first mode of operation; and
 the first switch is opened while maintaining the second switch in the closed state in response to detecting a fault during the first mode of operation.

10. The apparatus of claim 9, wherein the fault corresponds to a load current exceeding an amperage.

11. The apparatus of claim 10, wherein the amperage is equal to a maximum disconnect current of the first switch and the second switch.

12. The apparatus of claim 9, wherein the first path is electrically coupled in parallel to the second path.

13. The apparatus of claim 9, wherein a battery is electrically coupled in parallel to the first path and the second path.

14. The apparatus of claim 9, wherein the first path and the second path are electrically coupled to a battery and to one or more electric motors.

15. The apparatus of claim 14, wherein the one or more electrical motors is electrically coupled in parallel to the first path and the second path.

16. The apparatus of claim 14, wherein a current rating of the first fuse and the second fuse is one half a maximum operating current of the one or more electric motors.

17. A vehicle comprising:
   a battery enclosure, wherein the battery enclosure comprises:
      a first switch electrically coupled to a first fuse;
      a second switch is electrically coupled to a second fuse;
      a battery electrically coupled to one of the first switch and the first fuse and one of the second switch and the second fuse, wherein:
         the first switch and the second switch are both in a closed state during a first mode of operation; and
         the first switch is opened while maintaining the second switch in the closed state in response to detecting a fault during the first mode of operation.

18. The vehicle of claim 17, wherein the fault corresponds to a load current exceeding an amperage.

19. The vehicle of claim 18, wherein the amperage is equal to a maximum disconnect current of the first switch and the second switch.

20. The vehicle of claim 17, further comprising an electric motor, wherein the electric motor is electrically coupled to one of the first switch and the first fuse and one of the second switch and the second fuse.

\* \* \* \* \*